United States Patent

Berkey et al.

[11] Patent Number: 6,062,809
[45] Date of Patent: May 16, 2000

[54] LIFT FOR PHYSICALLY-CHALLENGED PASSENGERS AND METHOD OF OPERATION

[75] Inventors: Rex A. Berkey, Rock; Daniel DeFant, Marquette; Brad Hallum, Ishpeming; Jeffrey A. Hansen, Marquette; Edward L. Hopper, Negaunee; Philip Alan Johnson, Negaunee; Frank C. Saari, Negaunee; Randy Paul Sundell, Negaunee, all of Mich.

[73] Assignee: American Airlines Incorporated, Fort Worth, Tex.

[21] Appl. No.: 08/697,573

[22] Filed: Aug. 27, 1996

Related U.S. Application Data

[62] Division of application No. 08/207,961, Mar. 7, 1994, Pat. No. 5,595,470.

[51] Int. Cl.[7] ........................................... B60P 3/00
[52] U.S. Cl. ................ 414/809; 182/144; 244/137.2; 414/546; 414/921; 414/917; 414/540; 414/495; 414/812; 414/392; 414/399; 254/2 R
[58] Field of Search ................ 254/2 R, 10 R, 254/10 B, 10 C; 187/222, 234; 182/141, 144; 414/495, 921, 546, 592, 392, 539, 540, 537, 399, 812, 809, 800; 244/137.1, 137.2; 212/276, 272, 278, 279, 280, 281

[56] References Cited

U.S. PATENT DOCUMENTS

| | | | |
|---|---|---|---|
| 3,620,565 | 11/1971 | Eggert, Jr. | 296/28 A |
| 3,806,092 | 4/1974 | Richards | 254/122 |
| 3,888,463 | 6/1975 | O'Brien et al. | 254/10 C |
| 4,099,628 | 7/1978 | Richardson | 414/563 X |
| 4,114,854 | 9/1978 | Clark | 254/122 |
| 4,576,539 | 3/1986 | Williams | 414/391 |
| 4,690,606 | 9/1987 | Ross | 414/495 |
| 4,971,510 | 11/1990 | Houle | 414/546 |
| 5,105,915 | 4/1992 | Gary . | |
| 5,154,569 | 10/1992 | Eryou et al. | 414/495 |
| 5,205,697 | 4/1993 | Getty et al. | 414/341 |
| 5,322,408 | 6/1994 | Wooden | 414/495 |

FOREIGN PATENT DOCUMENTS 1095462  2/1981  Canada .

OTHER PUBLICATIONS

Daylight in Dallas/Ft. Worth, An American Airlines Roundup, GSE Today, Jun. 1993.

*Primary Examiner*—Frank E. Werner
*Attorney, Agent, or Firm*—Gray Cary Ware & Freidenrich, LLP

[57] ABSTRACT

A passenger lift (10) is provided for loading a passenger (12) into and out of an aircraft (14). Lift (10) includes a chassis (38) having a front (34) end and a back (36) end. A plurality of wheels (62 and 63) are attached to the chassis (38) providing means for moving the lift (10). The lift (10) also includes an electrical energy source (70) for providing electrical energy, and an energy converter (104) for translating the electrical energy from the electrical energy source (70) to mechanical energy. The lift (10) includes a rear support (40) generally perpendicular to the chassis (38) and attached to the back end of the chassis (38). The lift (10) has a basket (48) for holding the passenger (12) while the passenger is raised and lowered with the lift (10) and (48) is located at the front end of the chassis (38). The lift (10) includes a pair of lift arms (44) for lifting the basket (48), and a pair of stabilizing arms (42) for providing stability to the basket (48). The lift (10) also has a pair of lifting means (46) using the mechanical energy from the energy converter (104) for displacing the lifting arms (44) relative to the chassis (38) so as to raise and lower the basket (48).

7 Claims, 12 Drawing Sheets

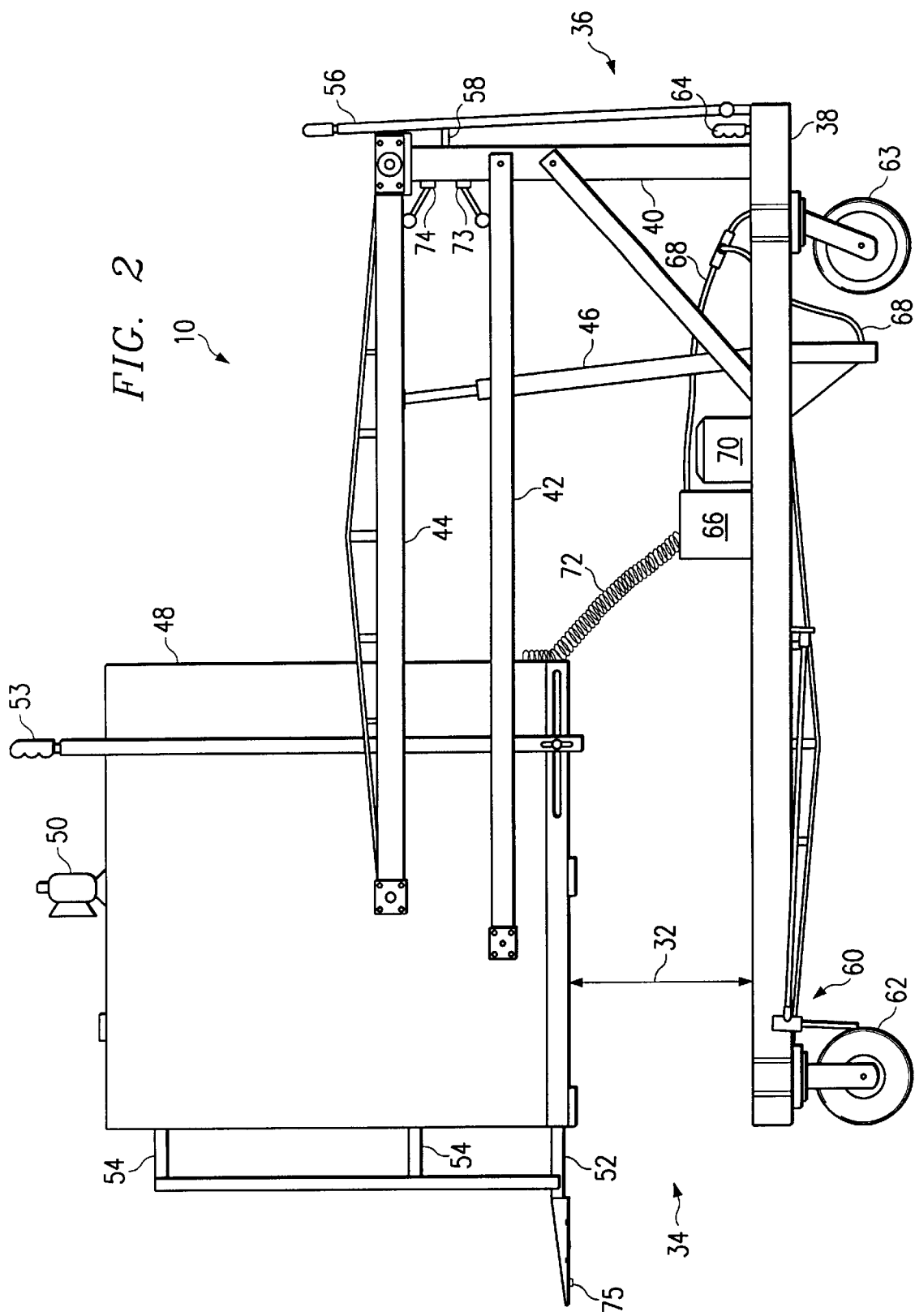

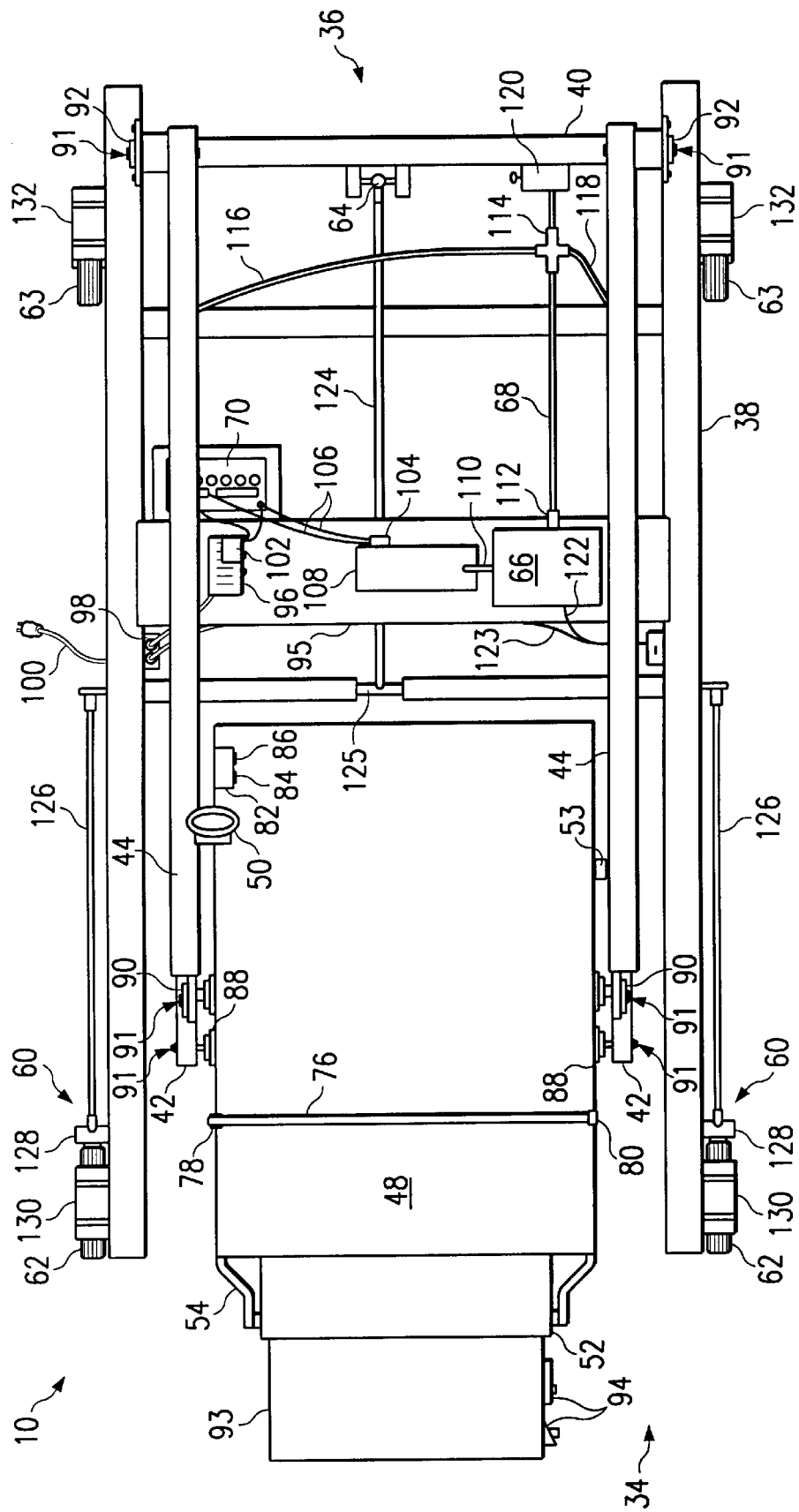

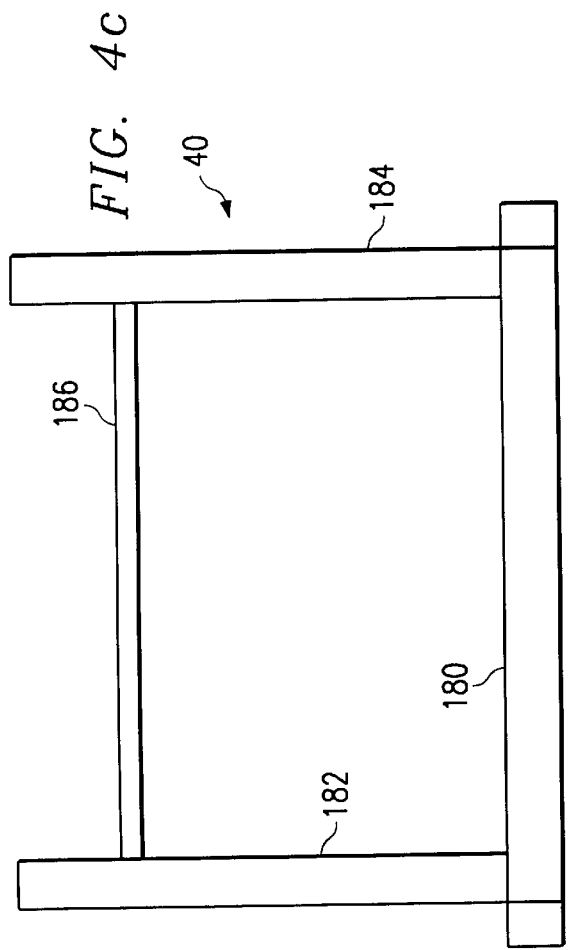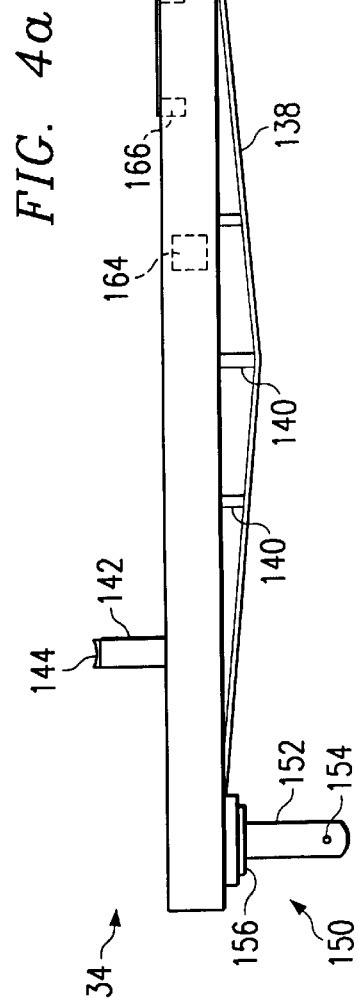

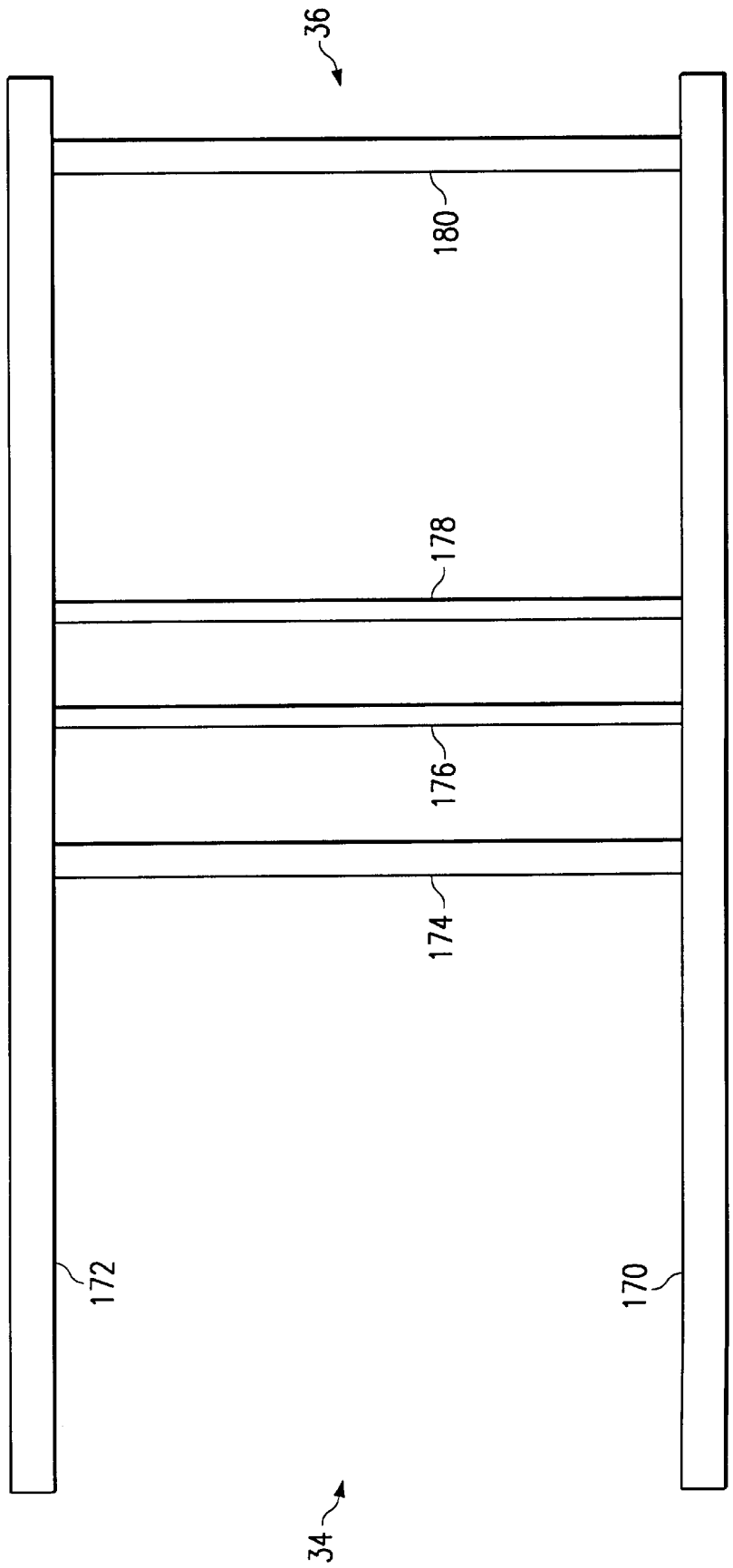

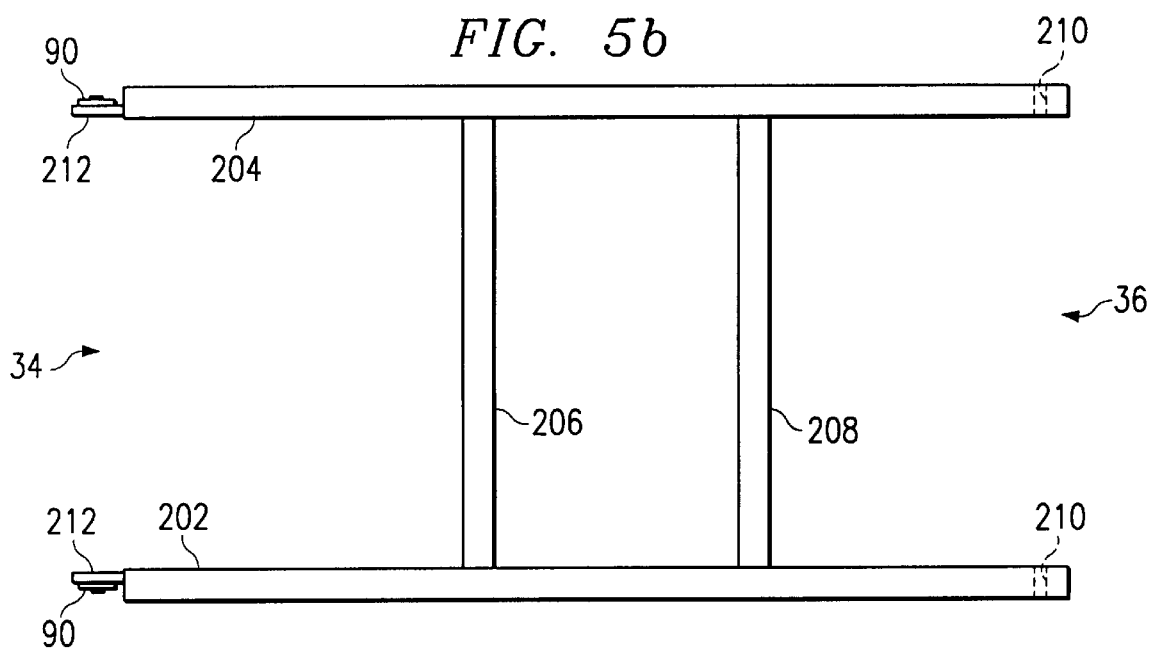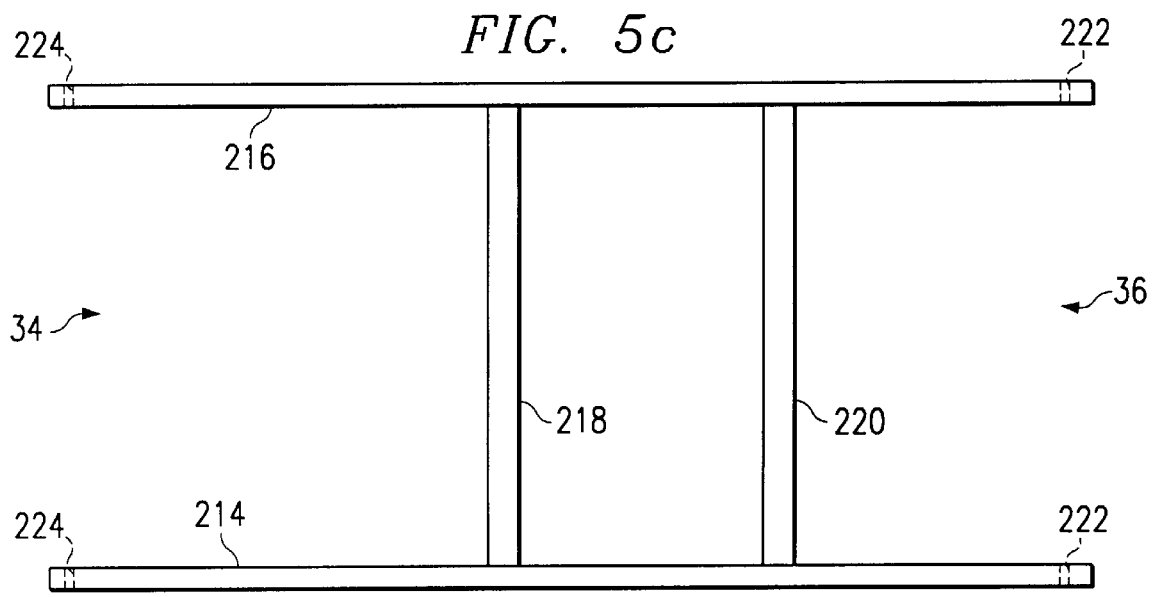

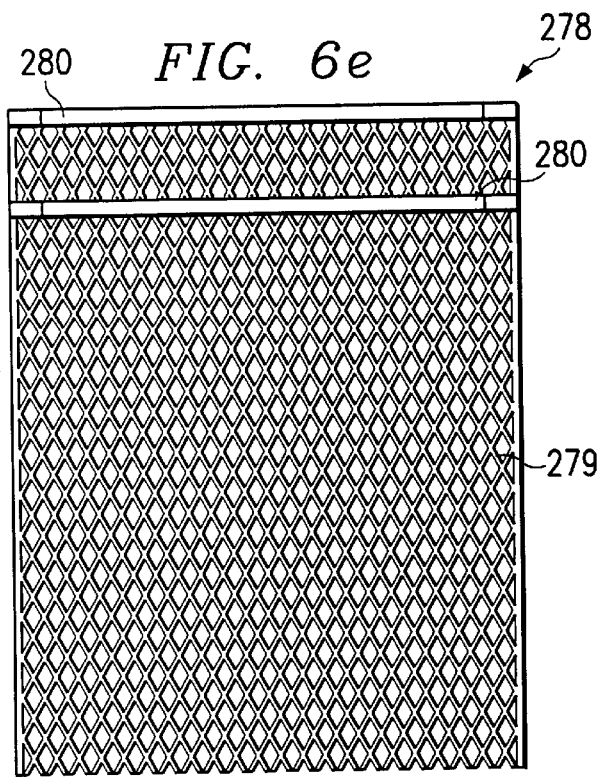
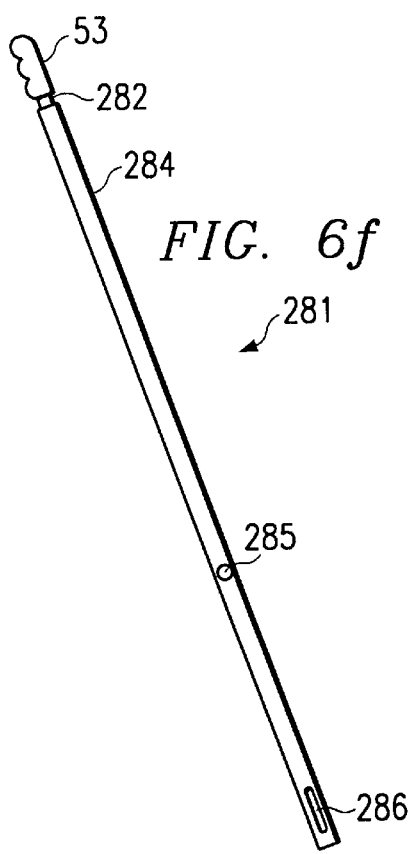
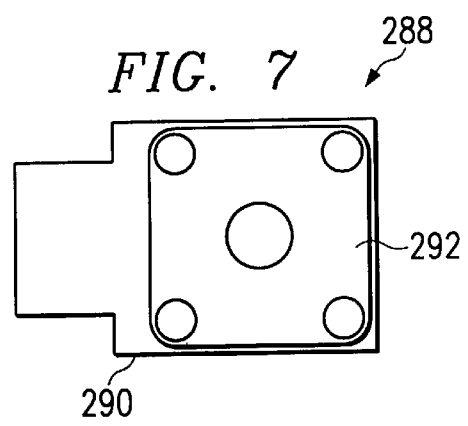

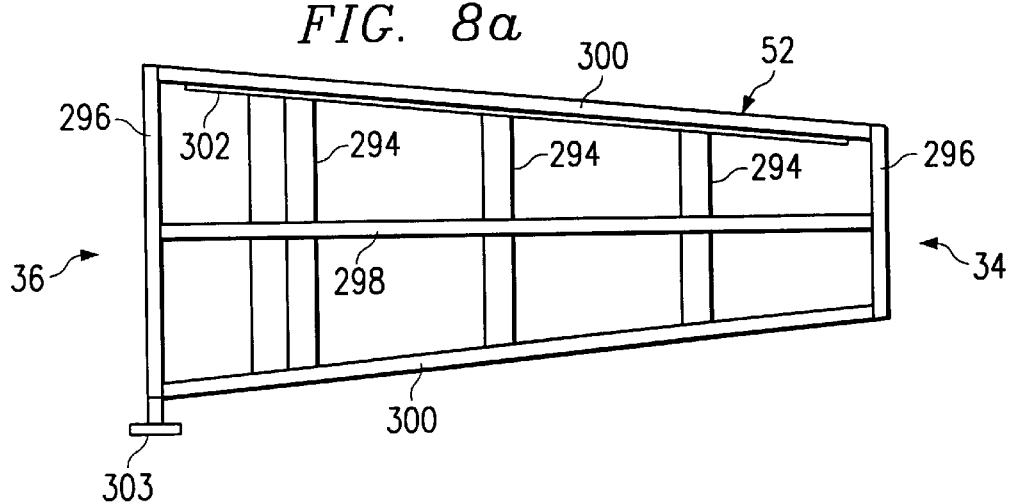
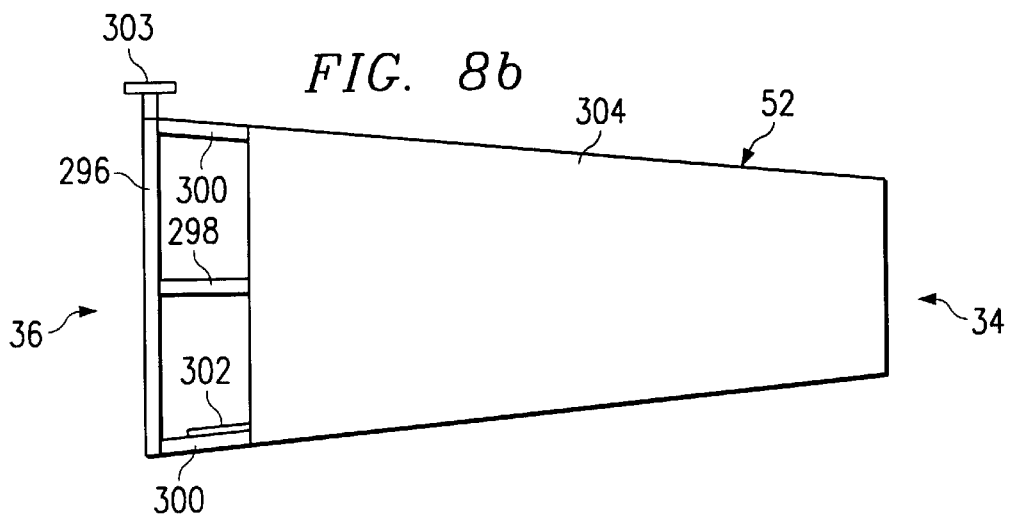
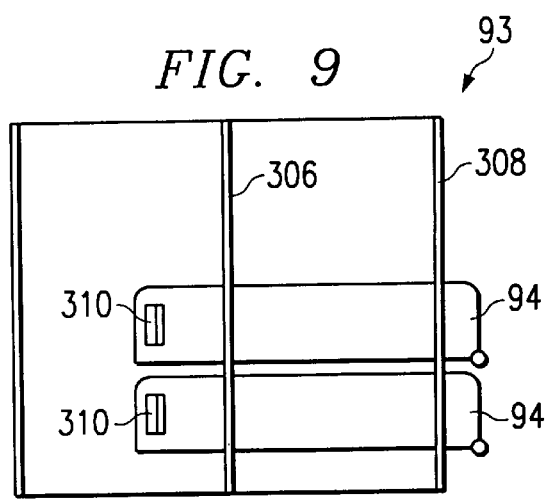

LIFT FOR PHYSICALLY-CHALLENGED PASSENGERS AND METHOD OF OPERATION

CROSS REFERENCE TO RELATED APPLICATIONS

This application is a divisional application of U.S. application Ser. No. 08/207,961, filed Mar. 07, 1994 and entitled "A Lift for Physically-Challenged Passengers and Method of Operation," now U.S. Pat. No. 5,595,470 issued Jan. 21, 1997.

TECHNICAL FIELD OF THE INVENTION

This invention relates in general to the field of passenger lifts, and more particularly to an economical lift for physically-challenged passengers and a method for operating the lift.

BACKGROUND OF THE INVENTION

Physically-challenged passengers, whether permanently or temporarily disabled, often find it difficult to go aboard and disembark an aircraft. Wheelchair-bound passengers often face difficult problems when traveling between a terminal and their aircraft seat. This is particularly true when there are no access ramps between the terminal and the aircraft. For example, commuter aircraft generally cannot use access ramps that larger airports use. To go aboard or disembark an aircraft, therefore, a physically-challenged passenger may have to enter the aircraft by ascending a set of steps adjacent the aircraft. Ascending stairs, however, is, in most cases, a serious impediment to passengers who use a wheelchair.

Physically-challenged passengers are therefore either denied use of such aircraft as a means for transportation or face the hazard and embarrassment of being manually lifted up a flight of stairs into the aircraft. Denying the passenger use of the aircraft makes no sense from a business perspective. As important as is this business concern, from a legal or regulatory standpoint as well, access for handicapped or physically-challenged persons is important. For example, new Department of Transportation (DOT) regulations require that airlines provide to physically-challenged passengers aircraft access. See DOT Advisory Circular entitled, Guide Specification for Lifts Used to Board Airlines Passengers with Mobility Impairments, AC No. 150/5220-21, dated Feb. 10, 1993. Manually lifting a passenger includes the hazard of the passenger being dropped by the ground personnel and the ground personnel being injured from the stress and strain of lifting the passenger.

Passenger lifts that exist are typically self-powered vehicles in which a driver must sit and steer and include complex motors or engines, drive trains, lift mechanisms, emission control systems, electrical systems, and other complex systems. The complexity of known passenger lifts makes them expensive to build or purchase, as well as difficult and expensive to maintain. The high acquisition and maintenance costs of previously developed passenger lifts makes them unacceptable for airlines and air terminals that are continually trying to operate more economically.

Therefore, a need has arisen for an economical passenger lift for physically-challenged persons.

A need exists for a passenger lift for physically-challenged persons that safely lifts a person into an aircraft while posing no risk of injury to ground personnel.

An additional need exists for a lift for a physically-challenged passenger that has a simple design requiring minimal maintenance.

SUMMARY OF THE INVENTION

The present invention provides an economical, simple lift for physically-challenged passengers that substantially eliminates or reduces disadvantages and problems associated with previously developed passenger lifts.

The present invention is a manual, steerable passenger lift for assisting a passenger to board and disembark a structure e.g., an aircraft, the aircraft having an elevated opening. The lift includes a chassis having a front end and a back end. A plurality of wheels are attached to the chassis allowing the lift to be moved and steered. The lift has a basket for holding the passenger and at least one other person in position as the lift raises and lowers the passenger. The chassis also includes a handle for manually moving and steering the lift with the passenger and person in the basket and a pair of lift arms for lifting the basket. The lift also includes a pair of stabilizing arms for stabilizing the basket. The lift also has a lifter for displacing the lifting arms relative to the chassis so as to raise and lower the basket.

Another aspect of the present invention is a method for lifting a passenger into and out of an aircraft with a manual, steerable lift having a basket for holding the passenger and at least one other person, the aircraft having an elevated opening. The method includes the steps of loading the passenger into the basket and manually moving the lift with the passenger and person into a position aligned with the structure's opening. The method further includes raising the basket with a lifter so as to displace a pair of lifting arms until the basket is level with the structure's opening, and stabilizing the basket during the raising step with a pair of stabilizing arms. The method also includes transferring the passenger from the basket to the structure.

A technical advantage of the present invention is the ability to safely lift a physically-challenged passenger to the door of an aircraft. An additional technical advantage of the present lift is that it eliminates lifting by ground personnel in helping physically-challenged passengers to board and deboard an aircraft.

A further technical advantage of the present lift is its simple design. The present lift can be made from off-the-shelf materials and parts which provides the present lift with a low acquisition cost. Additionally, the simplicity of the design of the present lift translates to a technical advantage of low maintenance cost and ease of repair.

An additional technical advantage of the present lift is its compatibility with all types of aircraft, whether forward engine, rear engine, jet or propeller driven. The present lift can be used to lift physically-challenged passengers into all types of aircraft.

The simple design of the present lift provides a technical advantage of being lightweight. This allows the lift to be easily maneuvered by ground personnel, even when loaded with a passenger.

The present lift provides a technical advantage of working in all types of environments. It may be deployed in dry conditions and wet conditions, including snow.

Yet another technical advantage of the present invention is that it uses rechargeable battery power as its power source. Using battery power eliminates the need for fuel purchase, storage, and handling as required for previously developed lifts using combustion engines as a power source. The present lift is therefore safer for use around aircraft. The present lift's use of electrical battery power as its energy source also does not result in exhaust emissions as with the previously developed lifts.

BRIEF DESCRIPTION OF THE DRAWINGS

For a more complete understanding of the present invention and the advantages thereof, reference is now made to the following descriptions taken in conjunction with the accompanying drawings in which like reference numbers indicate features and wherein:

FIG. 2 shows a side view of the present lift partially raised;

FIG. 3 is a topical view of the present lift;

FIGS. 4a–4c provide additional details on the chassis and rear support of the present lift;

FIGS. 5a–5c illustrate the stabilizing and lift arms of the present invention;

FIGS. 6a–6f show additional details on the basket of the present lift;

FIG. 7 provides a side view of a bearing assembly that may be used in the present lift;

FIGS. 8a and 8b illustrate bottom and top views respectively of the ramp of the present lift;

FIG. 9 provides additional details on the ramp extension and pull-out slides of the present lift;

DETAILED DESCRIPTION OF THE INVENTION

Preferred embodiments of the present invention are illustrated in the FIGURES, like numerals being used to refer to like and corresponding parts of the various drawings.

Figure 1A:
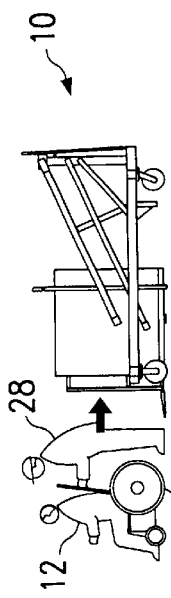
FIGS. 1–1c illustrate the present lift in operation loading a physically-challenged passenger into an aircraft.
Figure 1B:
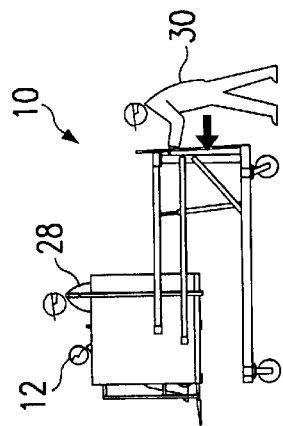
Figure 1C:
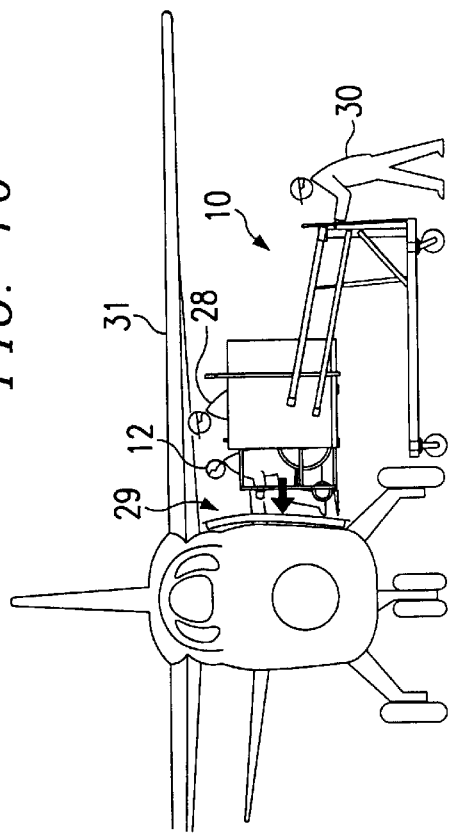
Figure 1:
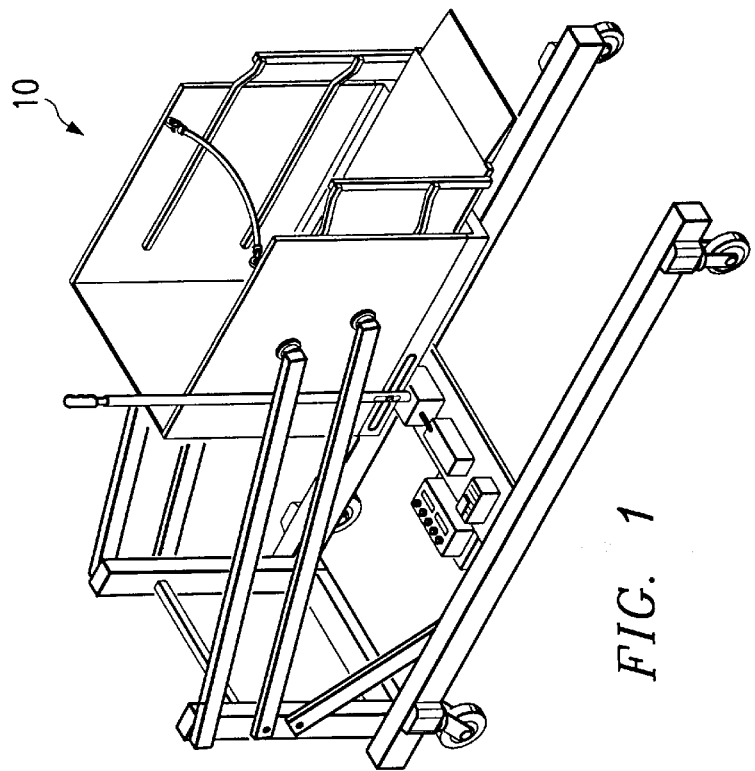

FIG. 1 shows empty lift 10 partially elevated. FIG. 1a illustrates the process of loading physically-challenged passenger 12 into lift 10. Passenger 12 is seated in straight-back 16 with straps (not explicitly shown) holding passenger 12 on straight-back 16. Lift operator 28 backs passenger 12 into lift 10. Ground personnel 30 then pushes lift 10, passenger 12, and lift operator 28 to opening 29 of aircraft 31 as shown in FIG. 1b. Ground personnel 30 positions lift 10 with passenger 12 and lift operator 28 aboard so that passenger 12 can gain access to aircraft 31. FIG. 1c illustrates passenger 12 in the process of loading into aircraft 31.

FIG. 2 shows a side view of lift 10 partially raised distance 32. The front of lift 10 is generally designated by reference number 34 while the back is designated by reference number 36. This convention of the front being designated by reference number 34 and the back designated by reference number 36 will be used throughout the remaining FIGURES.

Lift 10 includes chassis 38 with rear support 40 coupled thereto. Rear support 40 can be used by ground personnel 30 to manually move and steer lift 10 into position with aircraft 31. Attached to rear support 40 are a pair of stabilizing arms 42 and a pair of lift arms 44. Lift arms 44 are raised and lowered by a lifter or pair of hydraulic cylinders 46. Basket 48 of lift 10 is coupled to stabilizing arms 42 and lift arms 44. Basket 48 holds passenger 12 and lift operator 28 as they are raised and lowered with lift 10. Worklight 50 is shown attached to basket 48 and can illuminate the area around lift 10.

Ramp 52 is shown partially extending from basket 48. Ramp handle 53 couples to ramp 52 and is operated by lift operator 28 to extend and retract ramp 52. Multiple ramp handles 53, one on each side of basket 48, may also be employed. Guardrails 54 couple to ramp 52. Ramp 52 and guardrails 54, when fully extended, provide a safe plank when moving passenger 12 between aircraft 31 and basket 48.

Tongue assembly 56 couples to chassis 38 at back 36 of lift 10. Tongue assembly 56 can be used to pull lift 10 over extended distances. Tongue assembly 56 may be held in its up position depicted in FIG. 2 by tongue latch 58.

Lift 10 also includes brake assembly 60 which is used to prevent lift 10 from moving either while being stored or while passenger 12 is being loaded into or out of basket 48. Brake assembly 60 engages front wheels 62 so that lift 10 cannot move. Ground personnel 30 may engage brake assembly 60 by brake handle 64.

Front wheels 62 may be pneumatic tires or plastic tires. It may be desirable to use pneumatic tires for applications of lift 10 on rugged or snow covered surfaces. Back wheels 63 likewise, may be pneumatic or plastic.

FIG. 2 also partially shows the hydraulic and electrical systems of lift 10. Hydraulic reservoir 66 is coupled to hydraulic cylinders 46 by hydraulic lines 68. Hydraulic lines 68, in turn, provide hydraulic fluid under pressure to hydraulic cylinders 46. Also shown in FIG. 2 is the lift's electrical energy source or battery 70. Battery 70 provides the electrical energy necessary to raise basket 48 of lift 10. Battery 70 is coupled to the controls (not explicitly shown in FIG. 2) of lift 10 located inside basket 48 by control cable 72.

FIG. 2 illustrates a few of the safety features of lift 10. To ensure that stabilizing arms 42 and lift arms 44 are not raised too high, stabilizing arms limit switch 73 and lift arms limit switch 74 are included. Switches 73 and 74 are part of the electrical system of the present lift and cut mechanical energy to the hydraulic system if either arms 42 or 44 are raised beyond their preset safe limits. This provides a technical advantage of ensuring that lift 10 is not raised above a stable height.

Also shown in FIG. 2 is ramp limit switch 75. Ramp limit switch 75 is similarly coupled to the electrical system of lift 10 and ensures that no damage is done to aircraft 31 when basket 48 and ramp 52 are positioned in opening 29 of aircraft 31. Should lift operator 28 attempt to lower basket 48 and ramp 52 while positioned in aircraft opening 29 below the floor of opening 29, ramp limit switch 75 is engaged. Engagement of switch 75 causes the electrical power to the hydraulic system of lift 10 to be suspended. In this way, lift 10 ensures that no damage is done to aircraft 31 when positioning basket 48 and ramp 52 in aircraft opening 29.

FIG. 3 is a topical view of lift 10 with ramp 52 partially extended. Safety bar 76 is included in basket 48. Safety bar 76 holds passenger 12 and lift operator 28 in basket 48 as required. Safety bar 76 also provides passenger 12 with a feeling of security. Safety bar 76 is pivotally attached to basket 48 at safety bar pivot 78 and can be latched to basket 48 at safety bar latch 80.

Also shown in basket 48 is basket control 82. Basket control 82 controls the raising and lowering of basket 48 and is operated by lift operator 28 standing near back 36 of basket 48. Basket control 82 may be any commonly available switch having at least two positions. Lift-up button 84 and lift-down button 86 are shown in FIG. 3. Basket control 82 is coupled to the electrical system of lift 10 by control cable 72. Control cable 72 also provides electricity for operating worklight 50 in basket 48. Worklight 50 may be any commonly available 12 V light.

FIG. 3 shows that stabilizing arms 42 are slightly longer than lift arms 44. Stabilizing arms 42 are coupled to basket 48 by stabilizing arms bearing assemblies 88. Stabilizing arms 42 prevent excessive movement of basket 48 in the lateral direction. Lift arms 44 are coupled to basket 48 by lift arms bearing assemblies 90. Bearing assemblies 88 and 90 ensure that basket 48 remains level as it is raised and lowered. Bearing assemblies 88 and 90, therefore, may require lubrication to ensure their rotation when basket 48 is raised and lowered. Greasing bearing assemblies 88 and 90 through grease fittings 91 has been found to be a suitable lubrication.

FIG. 3 shows the connection between lift arms 44 and rear support 40. Back bearing assemblies 92 are used to make the coupling between rear support 40 and lift arms 44 pivotable. Back bearing assemblies 92 may require the application of grease through grease fittings 91 to ensure movement in this coupling.

Shown protruding from ramp 52 of basket 48 is ramp extension 93. Ramp extension 93 may be necessary for using lift 10 with certain aircraft. Aircraft requiring an angled approach of lift 10 in order to load passenger 12 can use ramp extension 93 and its pull-out slides 94 to ensure a safe transfer of passenger 12 between aircraft 31 and basket 48. If an angled approach by lift 10 to aircraft 31 is required, and ramp 52 is extended, there may be a gap between ramp 52 and aircraft opening 29 along one end of ramp 52. Pull-out slides 94 can be deployed to fill the gap to ensure a safe transfer of passenger 12 between aircraft 31 and basket 48.

FIG. 3 also shows additional details on the electrical and hydraulic systems of lift 10. The majority of these two systems are mounted on plate 95 secured to chassis 38. The primary power source of lift 10 is battery 70. Battery 70 may be embodied in any 12 V commercially available battery. Marine batteries have been found to be suitable for battery 70. Battery 70 is coupled to battery charger 96. Battery charger 96 is electrically coupled to electrical receptacle 98, which in turn has external power cord 100. External power cord 100 may be coupled to a 120 V source. Electrical receptacle 98, in turn, provides 120 V to battery charger 96 which charges battery 70 to 12 V. Battery charger 96 may also have charge meter 102 which monitors the charge on battery 70. Battery charger 96 may include a switch (not explicitly shown) that can suspend charging of battery 70 once a full charge is measured at battery 70. This prevents damage through over-charging battery 70.

Battery 70 provides electrical energy to an energy convertor or electric motor 104 by power lines 106. Electric motor 104 may be embodied in any commercially available electric motor and converts electrical energy from battery 70 to mechanical energy to drive hydraulic pump 108. Hydraulic pump 108 translates mechanical energy from electric motor 104 into pressure that is provided to hydraulic reservoir 66. Hydraulic reservoir 66 receives pressure from hydraulic pump 108 at input 110. Hydraulic reservoir 66 provides hydraulic pressure at output 112 to hydraulic line 68. Any commercially available hydraulic fluid may be used in the hydraulic system of lift 10.

Output 112 of hydraulic reservoir 66 provides hydraulic pressure by hydraulic line 68 to hydraulic-X 114. Hydraulic-X 114 splits the hydraulic pressure on line 68 to first hydraulic line 116 and second hydraulic line 118. Hydraulic lines 116 and 118 provide hydraulic pressure to hydraulic cylinders 46. An additional safety feature of lift 10 is emergency down valve 120 coupled to hydraulic-X 114. Should lift 10 malfunction with basket 48 in the raised position, then ground personnel 30 can lower basket 48 by simply opening emergency down valve 120. Opening emergency down valve 120 allows hydraulic pressure to escape from cylinders 46 thereby lowering lift arms 44.

To ensure proper operation of lift 10 in temperatures below freezing, a heating system for the hydraulic fluid used in lift 10 is included. Most hydraulic fluids at temperatures below freezing have high viscosity thereby preventing their effective use to move a piston in a cylinder. Hydraulic heater switch 121 is electrically coupled to a hydraulic fluid heater (not explicitly shown) in hydraulic reservoir 66 by lead 122. Hydraulic heater switch 121 is electrically coupled to battery 70 by lead 123 and electrical receptacle 98. By appropriately setting hydraulic heater switch 121, the heater in hydraulic reservoir 66 can be engaged to warm the hydraulic fluid. This provides lift 10 with a technical advantage of being operational at cold temperatures.

It is noted that the power and voltage ratings provided are by way of an example only. The present lift can be used with any rated battery provided it has sufficient energy capacity to drive the hydraulic system of lift 10.

FIG. 3 shows additional details for brake assembly 60 of lift 10. Parking brake handle 64 is mechanically coupled to back brake linkage 124 which in turn is mechanically coupled to transversal brake linkage 125. Transversal brake linkage 125 couples to front brake linkages 126 on both sides of chassis 38. Front brake linkages 126 engage parking brake bars 128 at each front wheels 62.

In operation of brake assembly 60, ground personnel 30 engages the brakes by displacing brake handle 64 away from basket 48. This causes brake handle 64 to drive back brake linkage 124 towards front 34 of lift 10. Driving linkage 124 forward causes transversal brake linkage 125 to pivot. Pivoting linkage 125 pushes front brake linkages 126 forward. Pushing linkages 126 forward causes parking brake bars 128 to engage front wheels 62.

Also shown in FIG. 3 are front wheel mounting plates 130. Mounting plates 130 are used to offset front wheels 62 from under chassis 38. Back wheel mounting plates 132 similarly displace back wheels 63 from under chassis 38. It is noted that front wheels 62 and back wheels 63 could be mounted directly underneath chassis 38 so as not to be viewable in the topical view of FIG. 3 without departing from the inventive concepts of the present lift.

In operation of lift 10 of FIGS. 1–3, while the lift is not being used, external power cord 100 is coupled to any standard 120 V power source. During storage, external power cord 100 provides electricity to electrical receptacle 98. Electrical receptacle 98, in turn, provides electrical energy to battery charger 96 and hydraulic heater switch 121. Battery charger 96 charges battery 70 until a full charge on battery 70 is detected. If lift 10 is subjected to temperatures below freezing, then hydraulic heater switch 121 should be engaged so that hydraulic fluid in hydraulic fluid reservoir 66 is warmed while lift 10 is stored.

When passenger 12 requires lifting into aircraft 31, lift operator 28 places passenger 12 in straight-back 16 securing passenger 12 with straps. Lift operator 28 then backs into basket 48 with passenger 12 on straight-back 16. Safety bar 76 is engaged to ensure that passenger 12 does not fall from basket 48. It is noted that brake assembly 60 should be engaged while loading passenger 12 into basket 48 to ensure that lift 10 does not move.

Before moving lift 10 to aircraft 31, power cord 100 should be decoupled from the external power source. Decoupling cord 100 can be accomplished either prior to or after loading passenger 12 into basket 48, but must be decoupled prior to moving lift 10, unless cord 100 is of sufficient length to reach aircraft 31.

Ground personnel 30 then pushes lift 10, including passenger 12 and lift operator 28 in basket 48, to an appropriate position to aircraft 31. Ideally, lift 10 should be positioned generally perpendicular with aircraft opening 29. Ground personnel 30 should then set brake assembly 60 by pulling brake handle 64. With lift 10 slightly displaced from aircraft 31, but aligned with aircraft opening 29, lift operator 28 engages lift-up button 84 of basket control 82. Engaging button 84 causes electric motor 104 to use electrical energy from battery 70 to drive hydraulic pump 108. Pump 108, in turn, creates pressure with the hydraulic fluid in hydraulic reservoir 66 in hydraulic lines 68, 116, and 118. Hydraulic lines 116 and 118 cause hydraulic cylinders 46 to expand thereby raising lift arms 44 and basket 48. Lift operator 28 holds lift-up button 84 until basket 48 reaches the necessary height to align with aircraft opening 29. If operator 28 attempts to overextend lift 10, then limit switches 73 and 74 will decouple electric motor 104 from battery 70 thereby preventing further raising of lift arms 44.

Basket 48 remains level while lift arms 44 are raised by hydraulic cylinders 46 through the relative rotation provided by stabilizing arms bearing assemblies 88 and lift arms bearing assemblies 90. These bearing assemblies allow basket 48 to tilt relative to lift arms 44 and stabilizing arms 42. stabilizing arms 42 provide additional stability to basket 48.

After basket 48 reaches the appropriate height for aircraft opening 29, ramp 52 is extended by lift operator 28 by pulling backwards on ramp handle 53 deploying ramp 52 and ramp extension 93 when necessary. Ramp 52 extends into opening 29. Safety bar 76 is then removed from latch 80 allowing lift operator 28 to push passenger 12 into aircraft 31 across ramp 52 on straight-back 16.

Once passenger 12 is satisfactorily seated on aircraft 31, lift operator 28 returns to basket 48 with empty straight-back 16. Lift operator 28 then retracts ramp 52 with ramp handle 53 so as to clear aircraft opening 29. Lift operator 28 can then lower basket 48 with lift-down button 86 of basket control 82. If ramp 52 has not fully cleared opening 29, then ramp limit switch 75 will be contacted stopping electric motor 104. In this way, damage to aircraft 31 is prevented.

Assuming proper clearance from aircraft 31, basket 48 is lowered by operating basket control 82. If either the hydraulic or electrical system of lift 10 should fail with basket 48 raised, then ground personnel 30 can open emergency down valve 120 so that cylinders 46 compress thereby lowering basket 48.

Once lift 10 is fully lowered, lift operator 28 exits basket 48, and ground personnel 30 pushes lift 10 back to storage where external power cord 100 is recoupled for recharging battery 70. This entire process can be repeated to remove passenger 12 from aircraft 31.

Lift 10 has several technical advantages demonstrated by the previous operational description. Because of its simplicity and use of the light components, lift 10 is a lightweight structure. This allows ground personnel 30 to easily push and maneuver lift 10 into proper position with aircraft 31. This eliminates the need for complex and expensive drive mechanisms. Additionally, because of the simple design of lift 10, it is easily serviced and maintained. Also, because the components used to build lift 10 are generally commercially available materials or parts, the cost of making or purchasing lift 10 is low in comparison to previously developed complex passenger lifts. Furthermore, lift 10 uses a rechargeable energy source and therefore eliminates the need for hazardous fuels such as gasoline or propane. The design of lift 10 shown generally in FIGS. 1, 2, and 3, has been found to be sufficiently stable in high winds, as occurring from jet blasts.

FIGS. 4a–4c depict additional details on chassis 38 and rear support 40 of lift 10. FIG. 4a is a side view of chassis 38 and rear support 40. Angle strut 136 runs from chassis 38 to rear support 40 as shown in FIG. 4a and adds additional strength to rear support 40. Angle strut 136 may be 2"×2"× ¼" steel tubing appropriately attached to chassis 38 and rear support 40. Chassis 38 may also include chassis truss 138. Chassis truss 138 has truss supports 140 of diminishing length from the truss center to either end. Chassis truss supports 140 may be embodied in 1"×2"×⅛" steel tubing, and truss 138 may be embodied in 2" flat steel stock. Chassis truss 138 adds additional support to chassis 38 so that heavy loads can be moved with lift 10.

Basket catch 142 is also attached to chassis 38 near front 34. Basket catch 142 has padding 144 on its top surface. Basket catch 142 and padding 144 support basket 48 when in the fully down position. Padding 144 provides a smoother ride in basket 48 as it is moved to and from aircraft 31. Catch 142 may be embodied in 1"×2"×⅛" steel tubing, and padding 144 may be any suitable material providing cushioning.

Hydraulic cylinder holder 146 is attached along the bottom surface of chassis 38. Holder 146 secures the lower end of each hydraulic cylinders 46. To provide additional support to holder 146, cylinder support 148 may be employed. Holder 146 may be embodied in 2"×2"×¼" steel tubing and support 148 may be embodied in a ½" steel plate.

Chassis 38 also includes supports for front wheels 62 and back wheels 63. Front wheel assemblies 150 each include wheel arm 152 with axle hole 154 therein. Front wheel assemblies 150 each includes front wheel mounting plate 130 and front wheel bearing assembly 156. Bearing assembly 156 allows front wheel assemblies 150 to rotate in a full circle under chassis 38. Front wheel bearing assembly 156 and wheel arm 152 may be embodied in commercially available swivel casters. Front wheel assemblies 150 are appropriately attached by welding or bolting to chassis 38.

Back wheel assemblies 158 each include wheel arm 160 and axle hole 162 therein. Back wheel assemblies 158 each also include back wheel plate 132. Back wheel plate 132 is attached by an appropriate means, such as welding or bolting, to chassis 38. Back wheel assemblies 158 are shown in FIG. 4a without a bearing assembly. In this embodiment shown in FIG. 4a, back wheel assemblies 158 cannot rotate relative to chassis 38. Back wheel arm 160 and axle hole 162 may be embodied in commercially available rigid casters. It is noted that back wheel assemblies 158 may include a bearing assembly similar to front wheel bearing assembly 156 to provide rotation of back wheel assemblies 158. Both front wheel plates 130 and back wheel plates 132 may be embodied in 1" cold rolled steel plates.

Chassis 38 also includes mounting holes 164, 166, and 168 into which support members between the chassis arms are secured, see FIG. 4b. Mounting holes 164, 166, and 168 show different configurations for the mounting holes where hole 164 is centered along chassis 38, and holes 166 and 168 are level with the top surface of chassis 38.

FIG. 4b shows a topical view of chassis 38 of lift 10. Chassis 38 includes first chassis arm 170 and second chassis arm 172. Chassis arms 170 and 172 may be embodied in 2"×3"×³⁄₁₆" steel tubing. Between chassis arms 170 and 172 are front support 174, first middle support 176, second middle support 178, and back bottom support 180, appropriately attached to chassis arms 170 and 172. Front support 174 may be embodied in 2"×2"×¼" steel tubing; first middle support 176 and second middle support 178 may be embodied in 1"×2"×⅛" steel tubing; and back support 180 may be embodied in 1"×3"×⅛" steel tubing. Support 174 may be appropriately secured between arms 170 and 172 using mounting holes 164 in each arm. Supports 176 and 178 may be appropriately secured between arms 170 and 172 using mounting holes 166 and 168, respectively, in each arm. Supports 176 and 178 may be generally covered by plate 95 as shown in FIG. 3.

FIG. 4c illustrates rear support 40 looking towards back 36 of lift 10. Rear support 40 includes first upright 182 and second upright 184. Uprights 182 and 184 are appropriately attached to back bottom support 180 to ensure a strong mechanical coupling. Uprights 182 and 184 may be embodied in 2"×3"×3/16" steel tubing. Uprights 182 and 184 also have top support 186 coupled therebetween. This provides rear support 40 with the required structural strength necessary to support stabilizing arms 42 and lift arms 44. Top support 186 may be embodied in, for example, 1"×3"×⅛" steel tubing.

Figure 5A:
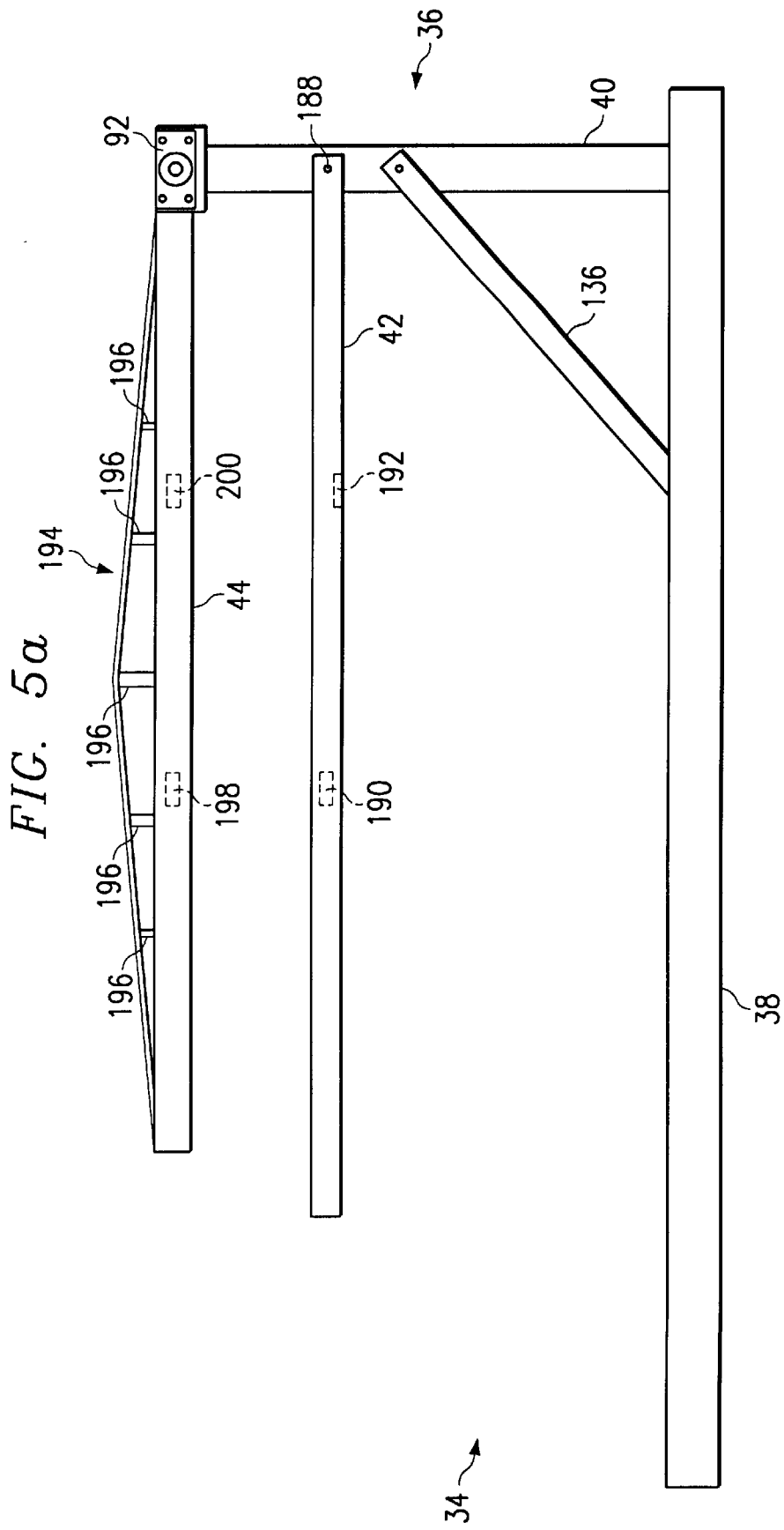

FIG. 5a illustrates additional detail on stabilizing arms 42 and lift arms 44. Stabilizing arms 42 may be formed from 1"×2"×⅛" steel tubing. Stabilizing arms 42 are pivotally coupled to rear support 40 at pivot 188. Stabilizing arms 42 include mounting holes 190 and 192 for receiving and attaching side supports. Mounting hole 190 is centered along stabilizing arms 42, while mounting hole 192 is flush with the bottom of stabilizing arms 42.

Lift arms 44 may be formed from 2"×3"×3/16" steel tubing. Lift arm truss 194 provides additional support to lift arms 44. Lift arm truss 194 has truss supports 196 of diminishing lengths from the center of truss 194. Truss supports 196 may be embodied in 1"×2"×⅛" steel tubing and truss 194 may be embodied in 2" flat steel stock.

Lift arms 44 are rotatably coupled to rear support 40 by back bearing assemblies 92. Back bearing assemblies 92 allow lift arms 44 to move in relation to rear support 40. Lift arms 44 also include mounting holes 198 and 200 for securing side supports. FIG. 5a shows both mounting holes 198 and 200 centered along arms 44.

FIG. 5b is a topical view showing additional details on lift arms 44. Lift arms 44 include first lift arm 202 and second lift arm 204. Lift arms 202 and 204 are held at an equal distance from one another by support 206 and support 208. Support 206 may be secured between arms 202 and 203 in mounting holes 198 in each arm, and support 208 may be secured in mounting holes 200 in each arm. Supports 206 and 208 may be embodied in 2"×2"×⅛" steel tubing. Back 36 of arms 202 and 204 each include passage 210 for accepting a pin (not explicitly shown) or other coupling means for coupling arms 44 to back bearing assemblies 92. Front 34 of lift arms 202 and 204 each have lift arms bearing assemblies 90 attached thereto by plate 212. Plate 212 is mechanically attached to lift arms 202 and 204. Plate 212 may be embodied in a 1" steel cold rolled plate.

FIG. 5c is a topical view showing additional details on stabilizing arms 42 of lift 10. Stabilizing arms 42 includes first stabilizing arm 214 and second stabilizing arm 216. Arms 214 and 216 are held equal distance from each other by support 218 and support 220. Support 218 may be secured between arms 214 and 216 in mounting hole 190 in each arm, and support 220 may be secured in mounting holes 192 in each arm. Supports 218 and 220 may be embodied in 2"×3"×3/16" steel tubing. Back 36 of support arms 214 and 216 each include passage 222 for receiving a bushing to attach the arms to rear support 40. Front 34 of arms 214 and 216, each include passage 224 for receiving a bushing for attaching to stabilizing arms bearing assemblies 88. Stabilizing arms 42 ensure that basket 48 has sufficient support when raised and lowered.

Figure 6A:
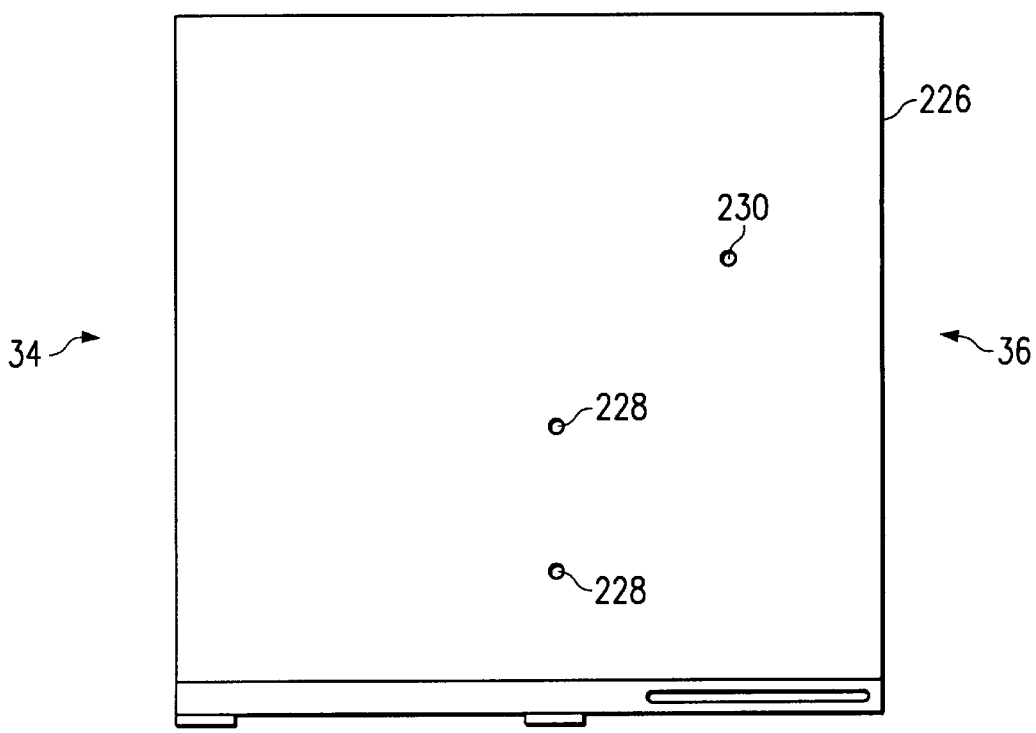

FIG. 6a shows an outside side view of panel side 226 of basket 48. Basket 48 includes two side panels 226. Panel 226 may be embodied in 1/16" sheet metal. Panel 226 has stabilizing arm mounting holes 228 and lift arm mounting holes 230. Mounting holes 228 and 230 should be positioned relative to one another as shown in FIG. 6a to ensure the stability of basket 48 when raised and lowered. Panel 226 is coupled to basket base 232 having slot 234 therein. Slot 234 is used in making a coupling from ramp handle 53 to ramp 52. Ramp 52 is stored in base 232 when not deployed.

Figure 6B:
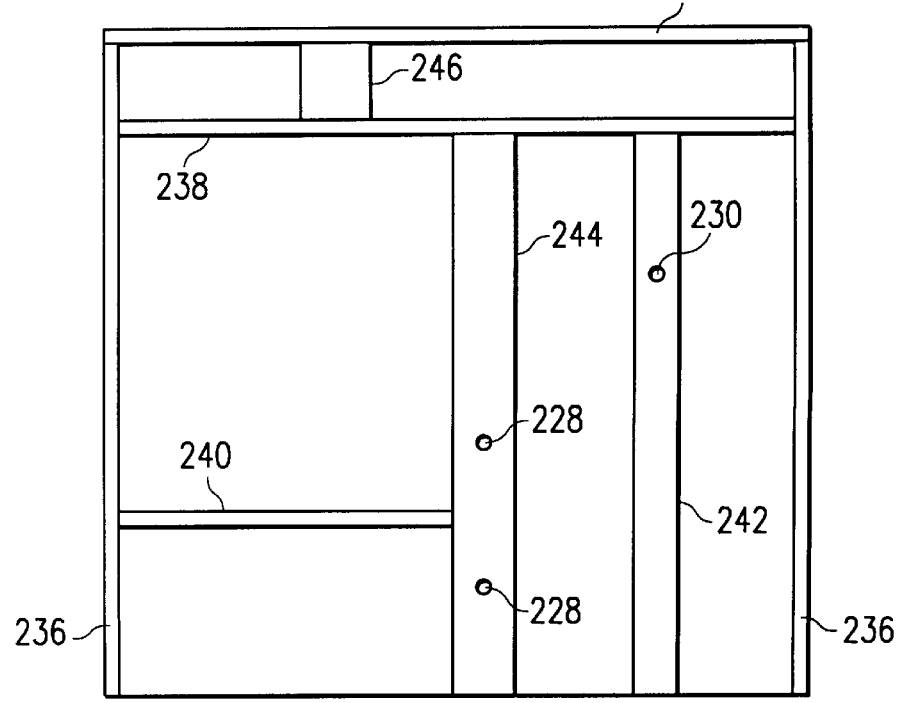

FIG. 6b shows an inside view of panel 226 above base 232. The inside of panel 226 includes perimeter supports 236 appropriately attached to panel 226. Supports 236 may be embodied in 1"×1"×0.065" steel tubing. Panel 226 also includes supports 238 and 240 running parallel with the top and bottom of panel 226 also attached to panel 226. Supports beams 238 and 240 may also be embodied in 1"×1"×0.065" steel tubing.

Panel 226 includes lift arm hole support 242 and stabilizing arm holes support 244 attached to panel 226. Supports 242 and 244 provide additional stability to the mounting holes to which the respective arms are attached. Support 242 may be embodied in 1"×2"×⅛" steel tubing, and stabilizing arm support 244 may be embodied in 1"×3×⅛" steel tubing.

Additionally, between top perimeter support 236 and support 238, and found only on the panel to which worklight 50 is mounted, is worklight bracket 246. Worklight bracket 246 is attached to panel 226, support 236, and support 238, and may be embodied in 1"×3"×⅛" steel tubing.

Figure 6C:
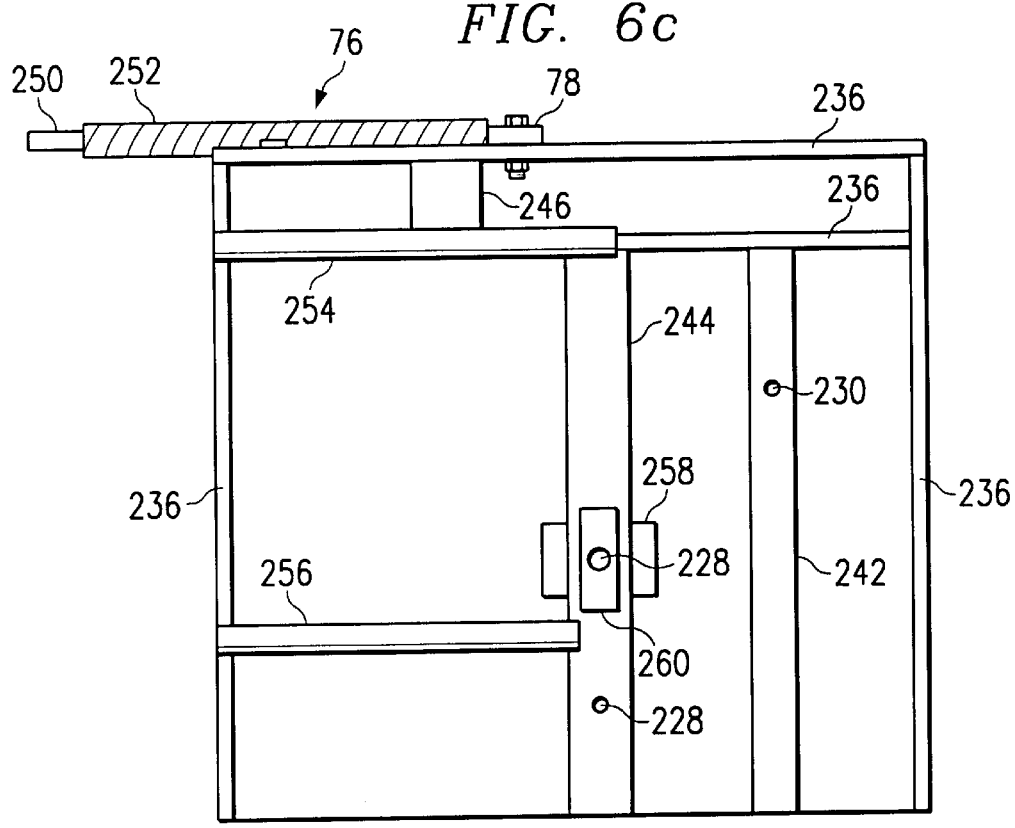

FIG. 6c shows additional details on inside panel 226 of basket 48. Safety bar 76 is coupled to panel 226 through top perimeter support 236 on pivot 78. Safety bar 76 may be embodied in a ½" steel bar 250, covered with pipe insulation 252. To provide additional support and protection inside basket 48, supports 238 and 240 may be covered with pipe 254 and 256, respectively. Pipes 254 and 256 can be welded to support beams 238 and 240 or otherwise appropriately attached. Pipes 254 and 256 may be embodied in a ¾" I.D. piping. To provide coupling between stabilizing arm hole support 244 and stabilizing arm mounting holes 228, the use of inside strap 258 and outside strap 260, respectively, may be desirable. Straps 258 and 260 may be embodied in ¼" straps.

Figure 6D:
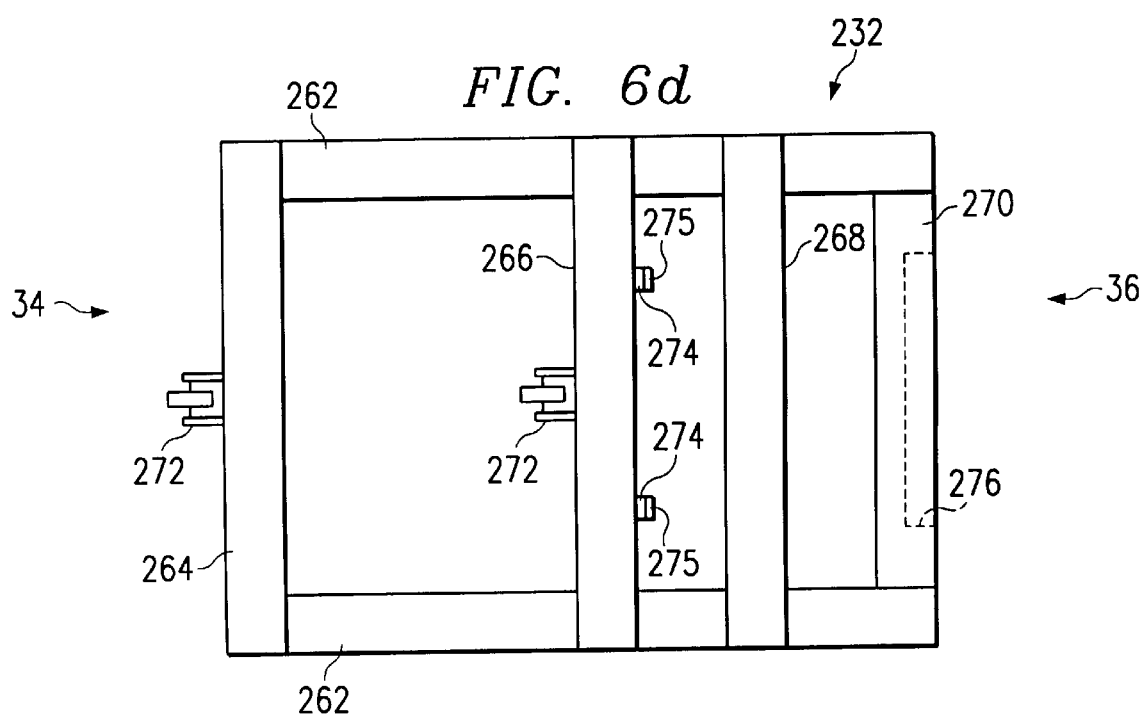

FIG. 6d shows a bottom view of basket 48. Base 232 includes longitudinal support 262 with transversal supports therebetween. Front transversal support 264, first middle transversal support 266, second middle transversal support 268, and back transversal support 270 maintain the structure and shape of base 232. Supports 264 and 266 have rollers 272 coupled thereto upon which ramp 52 may glide when extended and retracted. First middle transversal beam 266 includes two straps 274 covered with rubber pads 275. Straps 274 and pads 275 support ramp 52 when stored in base 232. Back transversal beam 270 includes bumper 276 formed in an angle cut from support 270. Bumper 276 ensures that retracting ramp 52 under base 232 does not damage ramp 52 or otherwise startle passenger 12 in basket 48. Supports 262, 264, 266, 268, and 270 may be embodied in 1"×2"×⅛" steel tubing. Bumper 276 may be made of any suitable rubber.

FIG. 6e shows back panel 278 of basket 48. Back panel 278 may be embodied in expanded metal mesh 279 having support members 280 supporting mesh 279. Supports 280 may be embodied in 1"×1"×0.065" steel tubing. Back panel 278 should be relatively transparent so that ground personnel 30 can see through basket 48 when pushing lift 10 forward from back 36.

FIG. 6f shows a side view of ramp control 281. Ramp control 281 includes ramp handle 53 and rod 282 with square tube 284 around rod 282. Rod 282 and square tube 284 have pivot hole 285 upon which ramp control 281 swivels. Ramp control 281 also includes slot 286 for engaging ramp 52, see FIG. 8b.

FIG. 7 shows an example of a bearing assembly that may be used for lift arms bearing assemblies 90. Bearing assembly 288 includes back plate 290 and square bearing assembly 292. Square bearing assembly 292 ensures that rotation relative to back plate 290 is achievable.

FIG. 8a is a bottom view of ramp 52. Ramp 52 has a narrower front 34 end relative to back 36 end. On the underside of ramp 52 are vertical supports 294, that may be embodied in 2"×2"×¼" steel tubing. Also on the underside of ramp 52 are end supports 296 that may be embodied in 1"×1"×0.065" steel tubing. The underside of ramp 52 includes center support 298 that may be embodied in 1"×1"× 0.065" steel tubing. Ramp 52 side supports 300 may also be embodied in 1"×1"×0.065" steel tubing. Also shown on the underside of ramp 52 is electrical conduit 302 for housing electrical wires between ramp limit switch 75 and the remainder of the lift's electrical system.

FIG. 8b shows a top view of ramp 52 with its supports partially exposed. Top 304 of ramp 52 may be embodied in 16-gauge sheet metal. To ensure that top 304 is not slippery, it is appropriate to paint top surface 304 and use silica sand to provide a traction surface for ramp 52. FIG. 8b also shows pin 303 to which slot 286 of ramp handle 53 engages. Pin 303 allows operator 28 to deploy ramp 52.

FIG. 9 shows an embodiment of ramp pull-out slides 94 of ramp 52. As previously described, in some applications, lift 10 must approach aircraft 31 at an angle. To close the resulting gap between ramp extension 93 and aircraft 31, pull-out slides 94 may be used. Pull-out slides 94 are supported by middle member 306 and front member 308. Angle stops 310 prevent pull-out slides 94 from being pulled too far out from ramp extension 93. It is noted that the shape and number of pull-out slides 94 is not limited to those shown in FIG. 9.

Figure 10:
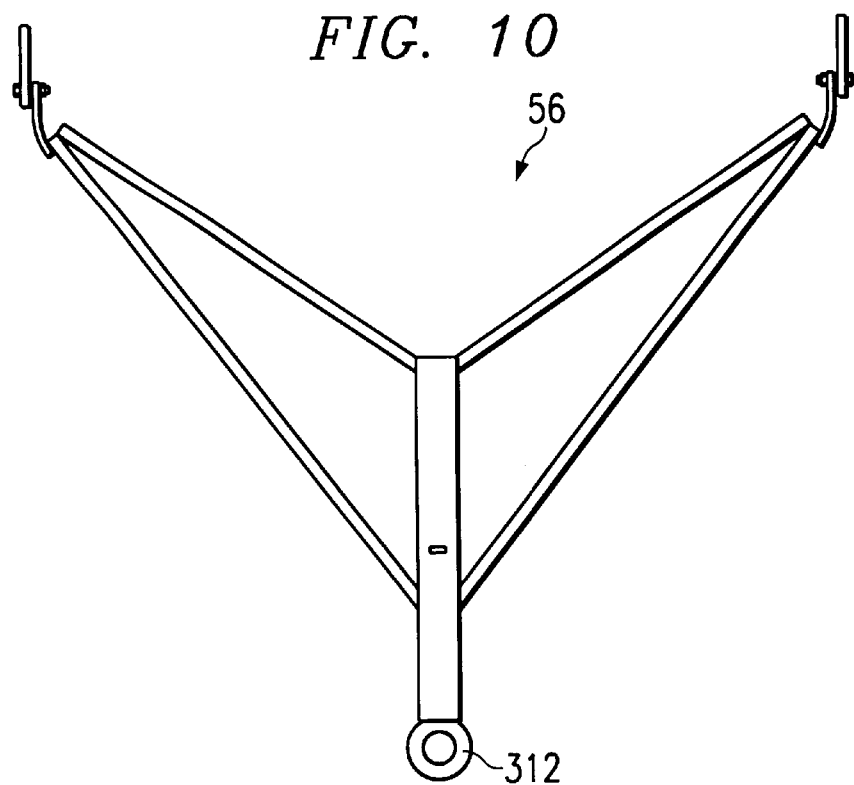
FIG. 10 is a top view of the tongue assembly of the present lift.

FIG. 10 provides additional detail on tongue assembly 56. By attaching to eyelet 312 of tongue assembly 56, lift 10 can be pulled over extended distances.

Figure 11A:
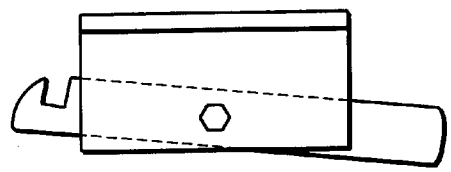
FIGS. 11a and 11b illustrate the tongue latch assembly of the present lift for holding the tongue assembly.
Figure 11B:
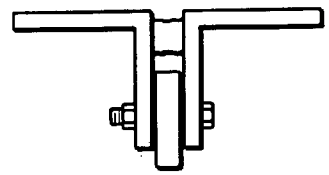

FIGS. 11a and 11b provide additional detail on tongue latch 58. FIG. 11a is a side view of tongue latch 58, whereas FIG. 11b is an end-view. Tongue latch 58 is used when lift 10 is being used to move passenger 12 and ensures that tongue assembly 56 does not fall and strike ground personnel 30.

The present invention provides a safe, low cost physically-challenged passenger lift. The present lift is simple in design and construction, and therefore, has minimal maintenance requirements.

Although the present invention has been described in detail, it should be understood that various changes, substitutions, and alterations can be made hereto without departing from the spirit and scope of the invention as defined by the appended claims.

What is claimed is:

1. A method for lifting a passenger into and out of an aircraft with a manual, steerable lift having a basket for holding the passenger and at least one other person, the aircraft having an elevated opening, the method comprising the steps of:

manually moving the lift, while also steering the lift, to a position that aligns the basket with the aircraft's opening;

raising the basket with a lifter so as to displace a pair of lift arms until the basket is level with the aircraft's opening;

stabilizing the basket with at least one stabilizing arm during the raising step;

monitoring the raising the basket step with at least one of a lift arm limit switch and a stabilizing arm limit switch, the lift arm limit switch being operable to detect when a lift arm is raised above a predetermined safety limit height and the stabilizing arm limit switch operable to detect when a stabilizing arm is raised above a predetermined safety limit height;

shutting down the lifter to prevent further raising of the lift arms if the lift arm limit switch detects that a lift arm has raised above a predetermined safety limit height or if the stabilizing arm limit switch detects that a stabilizing arm has raised above a predetermined safety limit height; and transferring the passenger to and from the aircraft.

2. The method of claim 1 further comprising the step of securing the lift with a brake assembly during the raising and transferring steps.

3. The method of claim 1 further comprising the step of extending a ramp from the basket to the opening of the aircraft prior to thee transferring step.

4. The method of claim 1 further comprising the step of converting electrical energy from an electrical energy source to mechanical energy for raising the basket with a lifter.

5. The method of claim 4, wherein the converting step comprises:

translating the electrical energy to mechanical energy with an electric motor;

converting the mechanical energy from the electric motor to fluid pressure; and applying the fluid pressure to the lifting means during the raising step so as to displace the lifting means.

6. The method of claim 1 further comprising pivotally attaching a pair of lift arms to the basket and pivotally attaching a pair of stabilizing arms to the basket.

7. The method of claim 6 further comprising coupling a pair of hydraulic cylinders to the chassis for displacing the lifting arms relative to the chassis so as to raise and lower the basket and associating each hydraulic cylinder with one of the lifting arms.

* * * * *